(12) United States Patent
Petersen et al.

(10) Patent No.: US 8,708,276 B1
(45) Date of Patent: Apr. 29, 2014

(54) LIGHTER THAN AIR EMERGENCY BEACON PLATFORM

(75) Inventors: Michael L. Petersen, Ridgecrest, CA (US); Thomas J. Groshens, Ridgecrest, CA (US); Elsa J. Hennings, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 169 days.

(21) Appl. No.: 13/552,259

(22) Filed: Jul. 18, 2012

(51) Int. Cl.
*B64B 1/58* (2006.01)

(52) U.S. Cl.
USPC ............................... 244/98; 244/29; 244/128

(58) Field of Classification Search
USPC .............. 244/24, 29, 30, 31, 98–98, 125–128
See application file for complete search history.

(56) References Cited

U.S. PATENT DOCUMENTS

| | | | | |
|---|---|---|---|---|
| 3,897,032 A | * | 7/1975 | Papst | 244/96 |
| 5,890,676 A | * | 4/1999 | Coleman et al. | 244/128 |
| 7,722,701 B2 | * | 5/2010 | Nehez | 95/45 |
| 7,735,777 B2 | * | 6/2010 | Zubrin et al. | 244/98 |
| 7,871,036 B2 | * | 1/2011 | Zubrin et al. | 244/98 |
| 7,913,948 B2 | * | 3/2011 | Porter | 244/63 |
| 2005/0224638 A1 | * | 10/2005 | Goodey | 244/30 |
| 2005/0281735 A1 | * | 12/2005 | Chellappa et al. | 423/648.1 |

* cited by examiner

*Primary Examiner* — Timothy D Collins
*Assistant Examiner* — Jamie S Stehle
(74) *Attorney, Agent, or Firm* — James M. Saunders

(57) ABSTRACT

A lighter than air emergency beacon platform as part of a hydrogen generation and filtration apparatus includes at least one power source having at least one activation switch. At least one reaction chamber is electrically connected to the at least one reaction chamber by at least one low-resistance electrical conductor. The reaction chamber is configured to house a hydrogen generating material. At least one flow disruption chamber is in fluid communication with the reaction chamber. The flow disruption chamber(s) are configured to provide fluid communication with the next flow disruption chamber in the direction of fluid flow. At least one inflatable housing is configured to carry payload and is in fluid communication with the flow disruption chambers. The inflatable housing is detached from a fill tube to lift the payload above terrain blocking line-of-sight signal communication.

19 Claims, 1 Drawing Sheet

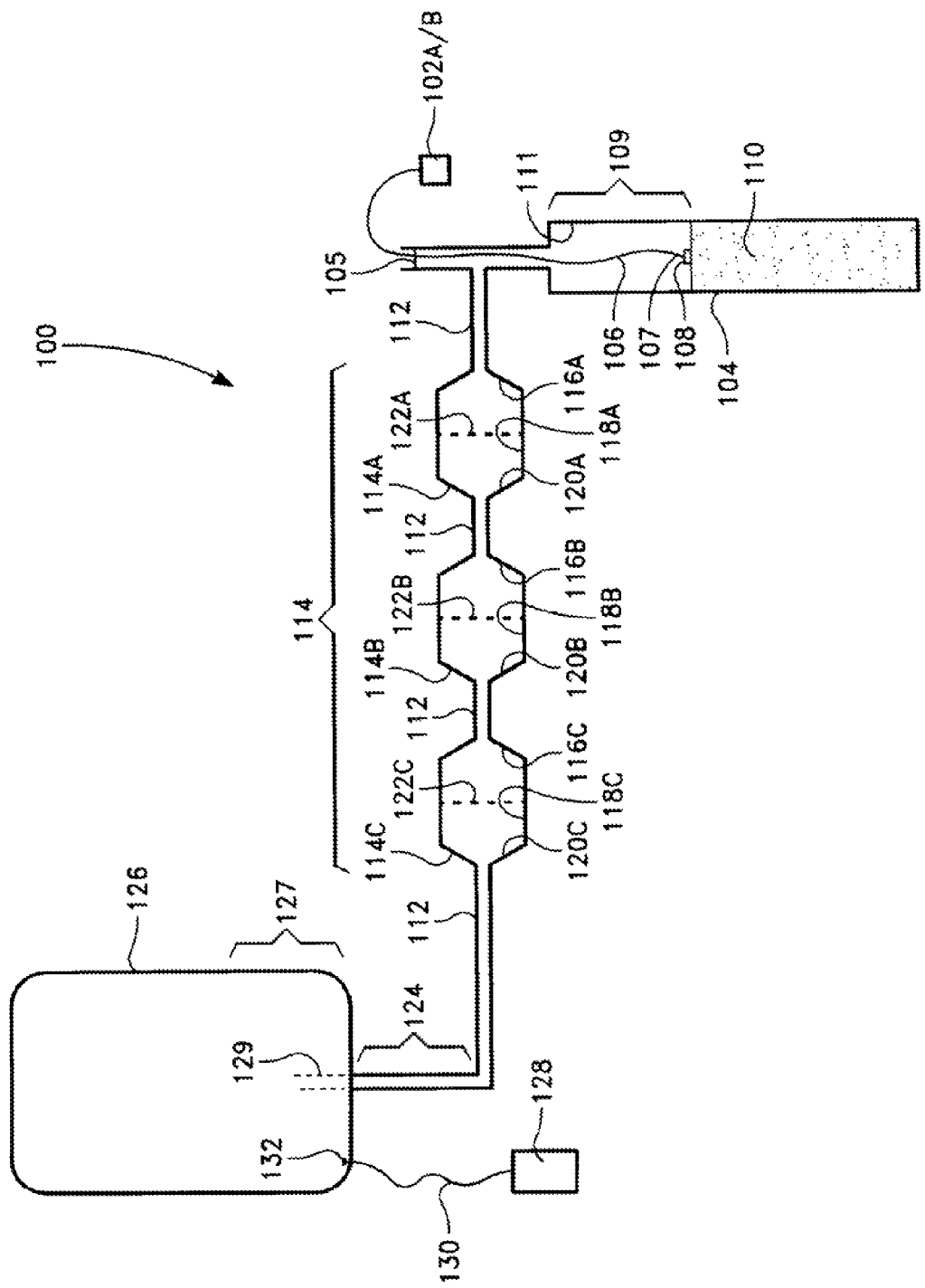

LIGHTER THAN AIR EMERGENCY BEACON PLATFORM

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefore.

FIELD OF THE INVENTION

The invention generally relates to balloons, and more particularly, to field-deployable lighter-than-air platforms to improve line-of-sight communications.

BRIEF DESCRIPTION OF THE DRAWINGS

FIG. 1 is an operating sequence for a lighter-than-air emergency beacon platform, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

The invention generally relates to balloons, and more particularly, to field-deployable lighter-than-air platforms to improve line-of-sight communications.

Isolated personnel trapped beyond line-of-sight communications due to natural and artificial terrain such as, for example, canyons, gullies, and buildings, have become casualties to hostile forces and injury. Likewise, many hydrogen generation techniques generate a fine particulate ash by-product. The generated ash can pose problems with equipment because the flow developed during hydrogen generation transports the ash through systems using the generated hydrogen, potentially clogging valves, adding mass to the balloon, and contaminating future reactions. Embodiments of the invention provide an airborne platform that can raise emergency beacons, radio repeaters, and other payloads above the surrounding terrain and also control generated ash in a manner that maintains operability of systems using the generated hydrogen.

Although embodiments of the invention are described in considerable detail, including references to certain versions thereof, other versions are possible. Examples of other versions include performing alternate combinations and sequencing of the flow disruption chambers, based on application-specific conditions. Therefore, the spirit and scope of the appended claims should not be limited to the description of versions included herein.

In the accompanying drawings, like reference numbers indicate like elements. FIG. 1 illustrates an operating sequence for a lighter than air emergency beacon platform, according to embodiments of the invention. Reference character 100 depicts an apparatus of embodiments of the invention.

Components may exist singularly or in pluralities, even though depicted as one or the other in the figures for simplified viewing, without detracting from the merits or generality of embodiments of the invention. Similarly, one having ordinary skill in the art will recognize that "at least one" can mean one or higher number. As such, for simplicity, "at least one" is sometimes referred to as "a," "an," or "the" such as, for example, describing "at least one low-resistance electrical conductor" as "a low-resistance electrical conductor" or "the low-resistance electrical conductor" to describe both singular and plural conditions without detracting from the merits or generality of embodiments of the invention. Likewise, all disclosed components are appropriately-configured and dimensioned, based on application-specific conditions.

Referring to FIG. 1, embodiments of the invention generally relate to an apparatus, including: at least one power source 102A having at least one activation switch 102B. The power source 102A includes at least one battery. For ease of viewing, the power source 102A and activation switch 102B are combined in the same rectangle. At least one reaction chamber 104 is electrically connected to the activation switch 102B by at least one low-resistance electrical conductor 106. The reaction chamber has at least one interior compartment 111 configured to house a hydrogen generating material 110. At least one high-resistance electrical conductor 108 is connected to a terminal end 107 of the low-resistance electrical conductor 106.

At least one flow disruption chamber 114 (shown with three chambers 114A through 114C for ease of viewing) is in fluid communication with the reaction chamber 104. Each of the flow disruption chambers 114A, 114B, and 114C is configured to provide fluid communication with the next flow disruption chamber in the direction of fluid flow. At least one inflatable housing 126 is in fluid communication with the flow disruption chambers 114.

Another embodiment of the invention generally relates to an apparatus, including: a battery 102A having an activation switch 102B. A reaction chamber 104 is electrically connected to the activation switch 102B by a low-resistance electrical conductor 106. The reaction chamber 104 has an interior compartment 111 configured to house a hydrogen generating material 110. A high-resistance electrical conductor 108 is connected to a terminal end 107 of the low-resistance electrical conductor 106. At least one flow disruption chamber 114 (shown in FIG. 1 with three chambers 114A, B, and C for ease of viewing) is in fluid communication with the reaction chamber 104. Each of the flow disruption chambers 114A, 114B, and 114C is configured to provide fluid communication with the next flow disruption chamber in the direction of fluid flow. An inflatable housing 126 is in fluid communication with at least one flow disruption chamber 114.

In embodiments, a person having ordinary skill in the art will recognize that fluid communication means gas created by the reaction of the hydrogen generating material 110 is able to flow between chambers. Likewise, the direction of fluid flow is from the reaction chamber 104 to the inflatable housing 126 via the associated components depicted in FIG. 1 and described herein. The inflatable housing 126 may also be referred to as a "balloon" or "inflatable envelope" without detracting from the merits or generality of embodiments of the invention.

In embodiments, the reaction chamber 104 is selected from the group of materials able to withstand temperatures of at least 400 degrees Celsius such as, for example, steel, ceramics, high temperature textiles, and high temperature plastics. The reaction chamber 104 is sealed (depicted as reference character 105 designating a sealed wall) to the environment. The low-resistance electrical conductor 106 passes through the sealed wall 105 in an appropriate fashion such as, for example, with a dedicated conduit. The low-resistance electrical conductor 106 may also pass through a different portion of the reaction chamber 104 depending on application-specific conditions.

In embodiments, the low-resistance electrical conductor 106 includes copper wire. The high-resistance electrical conductor 108 includes a nickel-chromium end (NiCr) in contact with the hydrogen generating material 110. The nickel-chromium end 108 is configured to increase to a temperature greater than 250 degrees Celsius.

In embodiments, the hydrogen generating material 110 includes at least one boron-nitrogen-carbon-hydrogen-compound. The hydrogen generating material 110 includes at least one guanidinium borohydride (GBH) pellet inside each interior compartment 111 of each reaction chamber 104. U.S. Pat. No. 8,029,602, issued Oct. 4, 2011, is directed to GBH, and is hereby incorporated by reference. A water source is not needed with GBH because the reaction is self-sustaining and generates a high percentage of hydrogen by mass (approximately 10.6 percent).

In embodiments, free space 109 exists above the hydrogen generating material 110 to allow for gas expansion. Fluid communication associated with the flow disruption chambers 114A, 114B, and 114C includes at least one flow transmission device 112 connecting each of the reaction chambers 104 and the first of the flow disruption chambers in the direction of fluid flow. Reference character 112 is selected to generically show flow transmission devices associated with the fluid communication between respective components. Varying orientations of the flow transmission devices 112 are possible.

The flow transmission device 112 may be appropriately-dimensioned pipes, tubes, or network of pipes and/or tubes that are appropriately-configured, based on application-specific conditions, to withstand temperatures in the range of 150 to 400 degrees Celsius such as, for example, polyvinyl chloride (PVC), high temperature textiles, and high temperature plastics.

At least one flow transmission device 112 connects each of the flow disruption chambers 114A, 114B, and 114C with the next flow disruption chamber in the direction of fluid flow. At least one flow transmission device 112 connects the last flow disruption chamber (depicted as 114C in FIG. 1) in the direction of fluid flow with the inflatable housing 126. The flow transmission device 112 connecting the last flow disruption chamber 114C with the inflatable housing 126 transitions at its distal end 124 to a fill tube 129 (depicted as dashed lines for ease of viewing) for inflating the inflatable housing. The distal end 124 of the flow transmission device 112 is a transition region between the flow transmission device and the fill tube 129. The distal end 124 of the flow transmission device 112 and the fill tube 129 are constructed of material capable of withstanding temperatures greater than 150 degrees Celsius such as, for example, PVC, high temperature textiles, and high temperature plastics.

In embodiments, a fill hole (not shown) at a distal end 127 of the inflatable housing 126, is appropriately-dimensioned to envelop the fill tube 129. A person having ordinary skill in the art will recognize that "envelop" may be replaced with the words "surround," "encircle," or "enclose," without detracting from the merits or generality of embodiments of the invention.

In embodiments, each flow disruption chamber 114A, 114B, and 114C has at least one filter 122A, 122B, and 122C connected to the interior surfaces 116A, 118A, 120A, 116B, 118B, 120B, 116C, 118C, and 120C of each of the flow disruption chambers 114A, 114B, and 114C. Each of the filters 122A, 122B, and 122C is appropriately-dimensioned and configured to drop ash out of the fluid communication. Ash will gravity settle to surfaces 118A, 118B, and 118C associated with the flow disruption chambers 114A, 114B, and 114C. Flow disruption chambers 114A, 114B, and 114C are selected from the group of materials capable of withstanding temperatures in the range of 150 to 400 degrees Celsius such as, for example, PVC, high temperature textiles, and high temperature plastics. Other materials may also be used, however heavier materials such as, for example, metals are not as beneficial because of the importance of weight reduction because a lighter platform allows for heavier payload 128 transport.

In embodiments, the flow disruption chambers 114A, 114B, and 114C may be connected in series or in parallel, depending on application-specific conditions. The number of flow disruption chambers 114A, 114B, and 114C employed in a given apparatus are determined based on the reaction quantity associated with application-specific conditions. Embodiments employing parallel orientations utilize a manifold to direct flow into the applicable flow-disruption chambers 114A, 114B, and 114C. In either orientation, decreasing mesh sizes of the filters 122A, 122B, and 122C may occur, based on application-specific conditions. Additionally, in other embodiments, testing results indicate that a single filter can result in the complete capture of ash. Thus, in those embodiments, a single flow disruption chamber (including 114A) having a single filter (including 122A) can entirely capture the ash.

In embodiments, component materials are selected based on application-specific conditions. Filters 122A, 122B, and 122C may be mesh, baffle inserts, or any combination. Filter 122A, 122B, and 122C materials may be copper, tungsten, textile, or other materials based on application-specific conditions. Mesh porosity may vary from merely disruptive of the flow to completely holding the ash.

In embodiments, the inflatable housing 126 is configured to lift a payload 128. The inflatable housing 126 is constructed of mylar, nylon, or other appropriate materials based on application-specific conditions. As depicted in FIG. 1, the payload 128 is connected to the inflatable housing 126 by a fastener 130. An attachment device 132 connects the fastener 130 to the inflatable housing 126. Fastener 130 and attachment device 132 selection is based on application-specific conditions. Examples of fasteners 130 include, but are not limited to, lanyards, cables, and string. Examples of attachment devices 132 include, but are not limited to, holes, eyelets, and grommets.

In embodiments, the apparatus 100 is appropriately-dimensioned (dimensions and weight) and configured based on application-specific conditions. Thus, certain embodiments are appropriately-dimensioned to allow a single person to early and engage the apparatus. In those embodiments, the apparatus 100 has a carrying apparatus such as, for example, a pouch, sleeve, or hard-walled protective device. Other embodiments are appropriately-dimensioned and configured for multiple personnel to carry and engage the apparatus such as, for example, in situations where larger and/or heavier payloads 128 need to be raised, based on application-specific conditions. This includes situations where payloads 128 are in excess of what one person can carry.

In embodiments, the operation sequence begins with the situation of one or more personnel who are injured or otherwise trapped in a location beyond line-of-sight radio communications and need to activate the apparatus 100 to raise a beacon or signal repeater above the surrounding terrain. A user removes the apparatus 100 from its carrying apparatus and the inflatable housing 126 is optionally unfurled. Components identified by reference characters 102 through 124 and 129 may be included in a self-contained hydrogen generation housing, in which the housing may be constructed of rigid or flexible materials. The housing (encapsulating reference characters 102 through 124 and 129) is attached to the inflatable housing by the fill tube 129. The hydrogen generation reaction is started by actuating an activation switch 102B such as, for example, by pressing a button on the apparatus 100. The reaction may also be started by a timer such as an arrangement using a computer chip/timer mechanism.

The switch 102B closes the circuit to the power source 102A such as, for example, a 9V (or similar) battery. Current flows through the electrical conductor 106 and increases the temperature of the nickel-chromium (NiCr) electrical conductor 108, which is in contact with the GBH pellet 110. The high-resistance of NiCr electrical conductor 108 causes the temperature of the electrical conductor to increase beyond the 250-degree activation temperature of GBH. At a temperature of about 250-degrees Celsius, the GBH begins to react with itself, generating 10.6 percent hydrogen by weight, 4 percent ammonia by quantity, and the remainder of the mass becoming a fine particulate ash. The ash and ammonia are byproducts that may be filtered out.

In embodiments, the linear reaction rate of GBH is approximately 0.5 cm/sec, resulting in a gaseous hydrogen flow rate high enough to transport the ash up through the reaction chamber 104 and through the flow transmission device 112 (tubing, piping, or other fluid communication mechanisms). To remove ash, the flow is directed into flow disruption chambers 114A, 114B, 114C where it optionally experiences an abrupt change in the channel cross-sectional area (surfaces 116A, 116B, and 116C), the filter 122A, 122B, and 122C, and optionally a second abrupt change in cross-sectional area (surfaces 120A, 120B, and 120C). Each of the aforementioned changes disturbs the flow enough to cause some of the ash to fall out of the flow.

In embodiments, as flow enters the first flow disruption chamber, ash is deposited on the side surfaces (116A, 116B, and 116C) of the chambers 114A, 114B, 114C. Flow is further disrupted as it passes through the filters 122A, 122B, and 122C, causing some ash to gravity settle (surfaces 118A, 118B, and 118C) in the flow disruption chambers 114A, 114B, 114C. Additional flow disruption chambers (114B and 114C in FIG. 1) reduce the amount of ash in the flow. As flow exits the chambers 114A, 114B, 114C, more ash is deposited on the exiting surfaces 120A, 120B, and 120C of the flow disruption chambers.

Flow then travels through flow transmission device 112 to its distal end 124 to the fill tube 129 into the inflatable housing 126. The inflatable housing 126 will unroll and unfurl itself as it fills with gas. When the reaction is complete, the inflatable housing 126 is detached from the fill tube 129 and sealed. Sealing is accomplished in any fashion appropriate to application-specific conditions. Some suitable sealing mechanisms include tape, clips, and self-adhesive seam in the inflatable housing 126. The payload 128 is then (or is already) attached to the inflatable housing 126 at attachment device 132 via fastener 130 and the apparatus 100 is released, allowing the inflatable housing to lift the payload above the terrain that is blocking the line-of-sight.

Experiments conducted by reacting 20 g of GBH demonstrated the ability of various flow disruption chamber filters to consistently remove approximately 20 percent of the ash-byproduct from the flow. Additionally, the temperature of the hydrogen decreased from its generation temperature of 400-degrees Celsius to approximately 150 degrees Celsius, which is below the melting point of an inflatable housing constructed using nylon or mylar film.

Future research includes, but is not limited to, combining flow disruption chambers with the reaction chamber, resulting in a single self-contained housing. One or more of the housings can then be used to produce the desired amount of hydrogen based on application-specific conditions.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A lighter-than-air platform, comprising:
    at least one power source having at least one activation switch;
    at least one reaction chamber electrically connected to said at least one activation switch by at least one low-resistance electrical conductor, wherein said at least one reaction chamber has at least one interior compartment configured to house a hydrogen generating material;
    at least one high-resistance electrical conductor connected to a terminal end of said at least one low-resistance electrical conductor;
    at least one flow disruption chamber in fluid communication with said at least one reaction chamber;
    wherein each of said at least one flow disruption chamber is configured to provide fluid communication with the next flow disruption chamber in the direction of fluid flow; and
    at least one inflatable housing in fluid communication with said at least one flow disruption chamber.

2. The platform according to claim 1, wherein said at least one power source is at least one battery.

3. The platform according to claim 1, wherein said at least one low-resistance electrical conductor is copper wire.

4. The platform according to claim 1, wherein said at least one high-resistance electrical conductor is a nickel-chromium end associated with said hydrogen generating material, wherein said nickel-chromium end is configured to increase to a temperature greater than about 250 degrees Celsius.

5. The platform according to claim 1, wherein said hydrogen generating material is at least one boron-nitrogen-carbon-hydrogen-compound.

6. The platform according to claim 1, wherein said hydrogen generating material comprises at least one guanidinium borohydride (GBH) pellet inside each of said at least one interior compartment of each of said at least one reaction chamber.

7. The platform according to claim 1, wherein said fluid communication associated with said flow disruption chamber(s), comprises:
- at least one flow transmission device connecting each of said at least one reaction chamber and the first of said at least one flow disruption chamber in the direction of fluid flow;
- at least one flow transmission device connecting each of said at least one flow disruption chamber with the next flow disruption chamber in the direction of fluid flow; and
- at least one flow transmission device connecting the last of said at least one flow disruption chamber in the direction of fluid flow with each of said at least one inflatable housing, wherein said at least one flow transmission device connecting the last of said at least one flow disruption chamber with each of said at least one inflatable housing transitions at its distal end to a fill tube for inflating each of said at least one inflatable housing.

8. The platform according to claim 7, further comprising a fill hole at a distal end of said at least one inflatable housing, wherein said fill hole is appropriately-dimensioned to envelop said fill tube.

9. The platform according to claim 1, wherein each of said at least one flow disruption chamber has at least one filter connected to the interior walls of each of said at least one flow disruption chamber, wherein each of said at least one filter is appropriately-dimensioned and configured to filter ash out of said fluid communication.

10. The platform according to claim 1, wherein said at least one inflatable housing is configured to lift a payload.

11. A lighter-than-air platform, comprising:
- a battery having an activation switch;
- a reaction chamber electrically connected to said activation switch by a low-resistance electrical conductor, wherein said reaction chamber has an interior compartment configured to house a hydrogen generating material;
- a high-resistance electrical conductor connected to a terminal end of said low-resistance electrical conductor;
- at least one flow disruption chamber in fluid communication with said reaction chamber;
- wherein each of said at least one flow disruption chamber is configured to provide fluid communication with the next flow disruption chamber in the direction of fluid flow; and
- an inflatable housing in fluid communication with said at least one flow disruption chamber.

12. The platform according to claim 11, wherein said low-resistance electrical conductor is copper wire.

13. The platform according to claim 11, wherein said high-resistance electrical conductor is a nickel-chromium end associated with said hydrogen generating material, wherein said nickel-chromium end is configured to increase to a temperature greater than about 250 degrees Celsius.

14. The platform according to claim 11, wherein said hydrogen generating material is at least one boron-nitrogen-carbon-hydrogen-compound.

15. The platform according to claim 11, wherein said hydrogen generating material comprises at least one guanidinium borohydride (GBH) pellet inside said interior compartment of said reaction chamber.

16. The platform according to claim 11, wherein said fluid communication of said flow disruption chamber(s), comprises:
- at least one flow transmission device connecting said reaction chamber and the first of said at least one flow disruption chamber in the direction of fluid flow;
- at least one flow transmission device connecting each of said at least one flow disruption chamber with the next flow disruption chamber in the direction of fluid flow; and
- at least one flow transmission device connecting the last of said at least one flow disruption chamber with said inflatable housing, wherein said at least one flow transmission device connecting the last of said at least one flow disruption chamber with said inflatable housing transitions at its distal end to a fill tube for inflating said inflatable housing.

17. The platform according to claim 16, further comprising a fill hole at a distal end of said inflatable housing, wherein said fill hole is appropriately-dimensioned to envelop said fill tube.

18. The platform according to claim 11, wherein each of said at least one flow disruption chamber has at least one filter connected to the interior walls of each of said at least one flow disruption chamber, wherein each of said at least one filter is appropriately-dimensioned and configured to filter ash out of said fluid communication.

19. The platform according to claim 11, wherein said inflatable housing is configured to hold a payload.

\* \* \* \* \*